US010652574B2

United States Patent

Kwon et al.

(10) Patent No.: US 10,652,574 B2
(45) Date of Patent: *May 12, 2020

(54) INTRA BLOCK COPY (INTRABC) COST ESTIMATION

(71) Applicant: TEXAS INSTRUMENTS INCORPORATED, Dallas, TX (US)

(72) Inventors: Do-Kyoung Kwon, Allen, TX (US); Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,428

(22) Filed: Oct. 16, 2018

(65) Prior Publication Data

US 2019/0052896 A1 Feb. 14, 2019

Related U.S. Application Data

(63) Continuation of application No. 14/506,085, filed on Oct. 3, 2014, now Pat. No. 10,104,395.

(60) Provisional application No. 61/890,505, filed on Oct. 14, 2013, provisional application No. 61/893,418, filed on Oct. 21, 2013.

(51) Int. Cl.
*H04N 19/567* (2014.01)

(52) U.S. Cl.
CPC .................................. *H04N 19/567* (2014.11)

(58) Field of Classification Search
USPC .................................................... 375/240.13
See application file for complete search history.

(56) References Cited

U.S. PATENT DOCUMENTS 10,104,395 B2 * 10/2018 Kwon .................. H04N 19/567
2010/0329341 A1 12/2010 Kam et al.
2011/0122942 A1 5/2011 Kudana et al.
2012/0039389 A1 2/2012 Sjoberg et al.
(Continued)

OTHER PUBLICATIONS

Benjamin Bross et al, High Efficiency Video Coding (HEVC) Text Specification Draft 10 (for FDIS & Last Call), JCTVC-L1003_v34, Joint Collaborative Team on Video Coding (JCT-VC) of ITU-T SG 16 WP3 and ISO/IEC JTC 1/SC 29/WG 11, pp. 1-298, Jan. 14-23, 2013, Geneva, Switzerland.

(Continued)

*Primary Examiner* — Christopher S Kelley
*Assistant Examiner* — Ana Picon-Feliciano
(74) *Attorney, Agent, or Firm* — Ebby Abraham; Charles A. Brill; Frank D. Cimino

(57) ABSTRACT

A method for encoding video data is provided that includes determining whether a parent coding unit of a coding unit of the video data was predicted in intra-prediction block copy (IntraBC) mode and, when the parent coding unit was not predicted in IntraBC mode: computing activity of the coding unit, determining an IntraBC coding cost of the coding unit by computing the IntraBC coding cost of the coding unit using a two dimensional (2D) search when the activity of the coding unit is not than an activity threshold, and computing the IntraBC coding cost of the coding unit using a one dimensional (1D) search; and when the activity of the coding unit is less than the activity threshold, using the IntraBC coding cost to select an encoding mode, and encoding the coding unit using the selected encoding mode.

17 Claims, 9 Drawing Sheets

(56) References Cited

U.S. PATENT DOCUMENTS

| | | | |
|---|---|---|---|
| 2012/0147960 | A1 | 6/2012 | Sato |
| 2015/0071357 | A1 | 3/2015 | Pang et al. |

OTHER PUBLICATIONS

Madhukar Budagavi and Do-Kyoung Kwon, "AHGb: Video Coding Using Intra Motion Compensation", JCTVC-M0350, Joint Collaborative Team on Video Coding (JCT-VC) of ITU-T SG 16 WP3 and ISO/IEC JTC 1/SC 29/WG 11, pp. 1-5, Apr. 18-26, 2013, Incheon, Korea.

Do-Kyoung Kwon and Madhukar Budagavi, "Non-RCE3: Intra Motion Compensation with Variable Length Intra MV Coding", JCTVC-N0206, Joint Collaborative Team on Video Coding (JCT-VC) of ITU-T SG 16 WP3 and ISO/IEC JTC 1/SC 29/WG 11, pp. 1-9, Jul. 25-Aug. 2, 2013, Vienna, Austria.

Chao Pang et al, "Non-RCE3: Intra Motion Compensation with 2-D MVs", JCTVC-N0256, Joint Collaborative Team on Video Coding (JCT-VC) of ITU-T SG 16 WP3 and ISO/IEC JTC 1/SC 29/WG 11, pp. 1-12, Jul. 25-Aug. 2, 2013 Vienna, Austria.

David Flynn et al, High Efficiency Video Coding (HEVC) Range Extensions Text Specification: Draft 4, JCTVC-N1005_v1, Joint Collaborative Team on Video Coding (JCT-VC) of ITU-T SG 16 WP3 and ISO/IEC JTC 1/SC 29/WG 11, pp. 1-310, Apr. 18-26, 2013, Incheon, Korea.

Do-Kyoung Kwon and Madhukar Budagavi, "AHG5: Fast Encoding Using Early Skipping of Intra Block Copy (IntraBC) Search", JCTVC-O0245, Joint Collaborative Team on Video Coding (JCT-VC) of ITU-T SG 16 WP3 and ISO/IEC JTC 1/SC 29/WG 11, pp. 1-21, Oct. 23-Nov. 1, 2013, Geneva, Switzerland.

Do-Kyoung Kwon and Madhukar Budagavi, "AHG5: Fast Encoding Using Early Skipping of Intra Block Copy (IntraBC) Search", JCTVC-N0245 Presentation, Joint Collaborative Team on Video Coding (JCT-VC) of ITU-T SG 16 WP3 and ISO/IEC JTC 1/SC 29/WG 11, pp. 1-16, Oct. 23-Nov. 1, 2013, Geneva, Switzerland.

David Flynn et al, "High Efficiency Video Coding (HEVC) Range Extensions Text Specification: Draft 6", JCTVC-P1005_v1, Joint Collaborative Team on Video Coding (JCT-VC) of ITU-T SG 16 WP3 and ISO/IEC JTC 1/SC 29/WG 11, pp. 1-344, Jan. 9-17, 2014, San Jose, CA.

David Flynn et al, "High Efficiency Video Coding (HEVC) Range Extensions Text Specification: Draft 7", JCTVC-Q1005_v9, Joint Collaborative Team on Video Coding (JCT-VC) of ITU-T SG 16 WP3 and ISO/IEC JTC 1/SC 29/WG 11, pp. 1-333, Mar. 27-Apr. 4, 2014, Valencia, Spain.

Rajan Joshi and Jizheng Xu, "High Efficiency Video Coding (HEVC) Screen Content Coding: Draft 1", JCTVC-R1005-v2, JCTVC-R1005_v2, Joint Collaborative Team on Video Coding (JCT-VC) of ITU-T SG 16 WP3 and ISO/IEC JTC 1/SC 29/WG 11, pp. 1-346, Jun. 30-Jul. 9, 2014, Sapporo, Japan.

"TMS320DM6467 Digital Media System-on-Chip", SPRS403G, Texas Instruments Incorporated, Dec. 2007, revised Oct. 2010, pp. 1-355.

Sharman K, Saunders N., and Gamei J., "AHG5: Range Extensions and High Bit Depths" JCTVC-M0178, Joint Collaborative Team on Video Coding, Apr. 18-26, 2013, Incheon, Korea.

* cited by examiner

INTRA BLOCK COPY (INTRABC) COST ESTIMATION

CROSS-REFERENCE TO RELATED APPLICATIONS

This application is a continuation of U.S. patent application Ser. No. 14/506,085 filed on Oct. 3, 2014 (now U.S. Pat. No. 10,104,395), which claims benefit of U.S. Provisional Patent Application Ser. No. 61/890,505, filed Oct. 14, 2013, and U.S. Provisional Patent Application Ser. No. 61/893,418, filed Oct. 21, 2013, all of which are incorporated herein by reference in their entireties for all purposes.

BACKGROUND OF THE INVENTION

Field of the Invention

Embodiments of the present invention generally relate to video coding using intra block copy cost estimation.

Description of the Related Art

The Joint Collaborative Team on Video Coding (JCT-VC) of ITU-T WP3/16 and ISO/IEC JTC 1/SC 29/WG 11 has recently released the first version of the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer transform, which is followed by quantization and coding of the transform coefficients.

HEVC Version 1 primarily focuses on 8-bit/10-bit YUV 4:2:0 video and provides 50% higher coding efficiency than its predecessor AVC/H.264. Standardization efforts, referred to as HEVC Range extensions (HEVC RExt), are currently underway in the JCT-VC to extend HEVC to support bit depths larger than 10 bits and color sampling of 4:2:2 and 4:4:4. Among the tools under consideration for HEVC RExt (or later versions) are tools for improving coding efficiency of screen content video. The work on screen content coding is motivated by the increasing popularity of applications such as wireless displays, remote desktop, remote gaming, distance education, cloud computing, automotive infotainment, etc. Video in such applications often has mixed content in a single picture that includes some combination of natural video, text, and graphics.

SUMMARY

Embodiments of the present invention relate to methods, apparatus, and computer readable media for video coding using intra block copy estimation. In one aspect, a method for encoding a video stream is provided that includes computing activity of a block of video data in the video stream when a parent block of the block is not predicted in intra block copy (IntraBC) mode, computing an IntraBC coding cost of the block based on a two dimensional (2D) search when the activity is not less than an activity threshold, computing the IntraBC coding cost of the block based on a one dimensional (1D) search when the activity is less than the activity threshold, and selecting a best mode for encoding the block based on the IntraBC coding cost.

In one aspect, a method for encoding a video stream is provided that includes computing an inter-prediction cost for a block of video data in the video stream, computing an intra-prediction cost for the block, selecting a best mode for encoding the block based on the inter-prediction cost and the intra-prediction cost when a minimum the inter-prediction cost and the intra-prediction cost is less than a cost threshold, determining whether or not a parent block of the block was predicted in IntraBC mode when the minimum is not less than the cost threshold, computing an IntraBC coding cost of the block with a two dimensional (2D) search when the parent block was predicted in IntraBC mode, computing activity of the block when the parent block of the block was not predicted in intra block copy (IntraBC) mode, computing an IntraBC coding cost of the block based on a two dimensional (2D) search when the activity is not less than an activity threshold, computing the IntraBC coding cost of the block based on a one dimensional (1D) search when the activity is less than the activity threshold, and selecting a best mode for encoding the block based on the IntraBC coding cost.

In one aspect, an apparatus for encoding a video stream is provided that includes means for computing activity of a block of video data in the video stream when a parent block of the block is not predicted in intra block copy (IntraBC) mode, means for computing an IntraBC coding cost of the block with a two dimensional (2D) search when the activity is not less than an activity threshold, means for computing the IntraBC coding cost of the block based on a one dimensional (1D) search when the activity is less than the activity threshold, and means for selecting a best mode for encoding the block based on the IntraBC coding cost.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
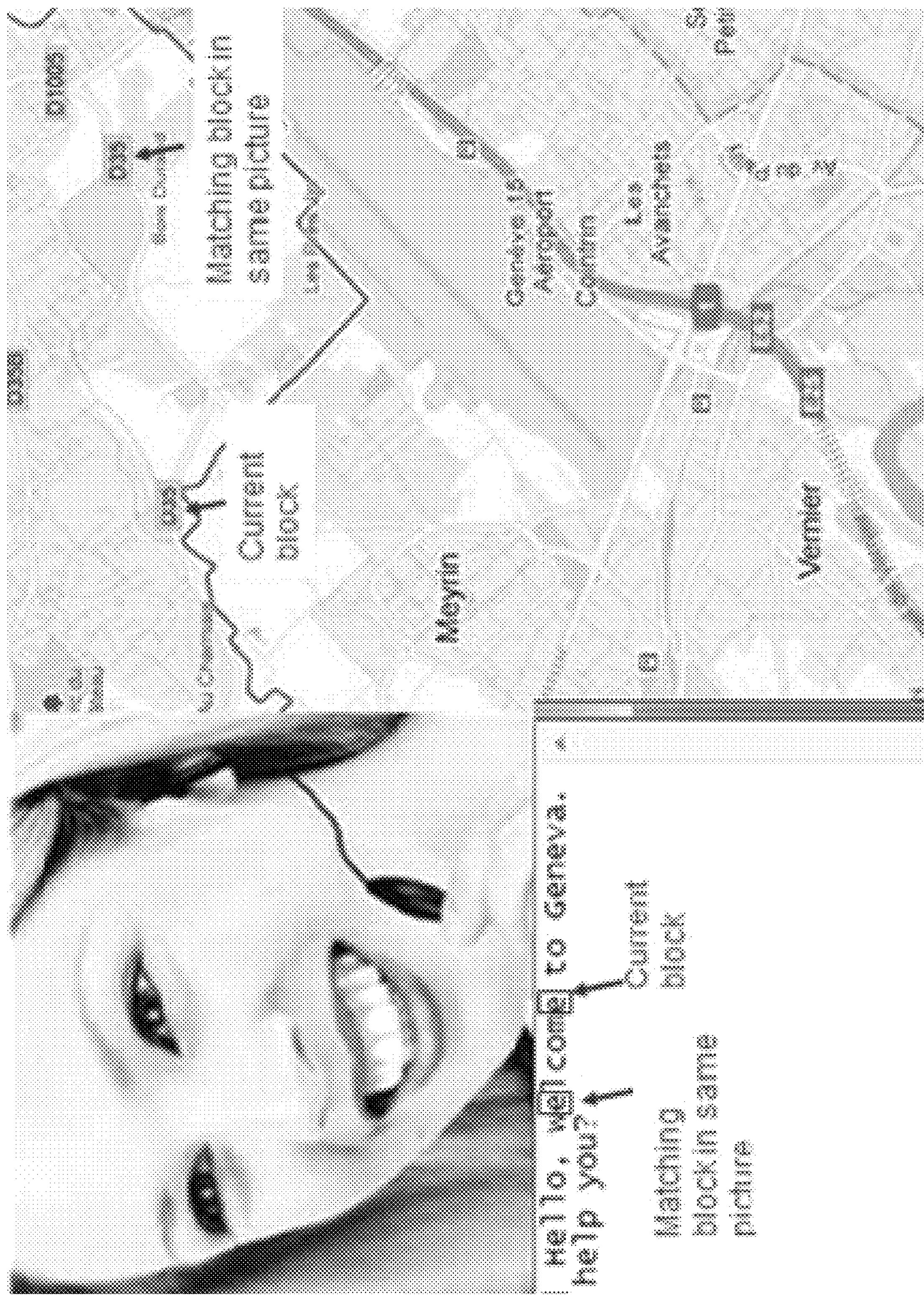
FIG. 1 is an example of mixed content video.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

HEVC version 1 is described in B. Bross, et al., "High Efficiency Video Coding (HEVC) Text Specification Draft 10 (for FDIS & Last Call)," JCTVC-L1003_v34, Joint Collaborative Team on Video Coding (JCT-VC) of ITU-T SG16 WP3 and ISO/IEC JTC1/SC29/WG11, Geneva, CH, Jan. 14-23, 2013, which is incorporated by reference herein in its entirety. Versions of HEVC RExt are described in D. Flynn, et al., "High Efficiency Video Coding (HEVC) Range Extensions Text Specification: Draft 4," JCTVC-N1005_v1, Joint Collaborative Team on Video Coding (JCT-VC) of ITU-T SG16 WP3 and ISO/IEC JTC1/SC29/WG11, Incheon, KR, Apr. 18-26, 2013, D. Flynn, et al., "High Efficiency Video Coding (HEVC) Range Extensions Text Specification: Draft 6," JCTVC-P1005_v1, Joint Collaborative Team on Video Coding (JCT-VC) of ITU-T SG16 WP3 and ISO/IEC JTC1/SC29/WG11, San Jose, Calif., Jan. 9-17, 2014, and D. Flynn, et al., "High Efficiency Video Coding (HEVC) Range Extensions Text Specification: Draft 7," JCTVC-Q1005_v6, Joint Collaborative Team on Video Coding (JCT-VC) of ITU-T SG16 WP3 and ISO/IEC JTC1/SC29/WG11, Valencia, Spain, Mar. 27-Apr. 4, 2014 which are incorporated by reference herein in their entirety.

The JCT-VC recently created a separate draft specification for the screen content coding portion of HEVC RExt: R. Joshi and J. Xu, "High Efficiency Video Coding (HEVC) Screen Content Coding: Draft 1," JCTVC-R1005-v2, Joint Collaborative Team on Video Coding (JCT-VC) of ITU-T SG16 WP3 and ISO/IEC JTC1/SC29/WG11, Sapporo, Japan, Jun. 30-Jul. 9, 2014, which is incorporated by reference herein in its entirety.

Some aspects of the disclosure have been presented to the JCT-VC in the following document, which is incorporated by reference herein in their entirety: D. Kwon and M. Budagavi, "AHG5: Fast Encoding Using Early Skipping of Intra Block Copy (IntraBC) Search," JCTVC-00245, Joint Collaborative Team on Video Coding (JCT-VC) of ITU-T SG16 WP3 and ISO/IEC JTC1/SC29/WG11, Geneva, Switzerland, Oct. 23-Nov. 1, 2013.

As previously mentioned, tools for improving coding efficiency of screen content video are under consideration. Such tools are important due to the increasing popularity of applications such as remote desktop, remote gaming, cloud computing, etc. Video content in such applications typically has mixed content that may include natural video, text, graphics etc. as illustrated in the example of FIG. 1. Graphics and text regions in pictures such as that of FIG. 1 have sharp edges that are sometimes not predicted well using intra prediction tools in current video coding standards, resulting in prediction error levels in intra coded blocks that are higher than those for natural video.

One such tool under consideration is an intra prediction tool referred to as intra block copy (IntraBC). The example frame of screen content video of FIG. 1 is dominated by text and graphics. As is highlighted in FIG. 1, areas of a screen content video frame having text and/or graphics may have repeating patterns. IntraBC exploits this redundancy to improve coding efficiency. The underlying idea of IntraBC is that a block of pixels, e.g., a CU or a PU, in a picture that is to be coded can be predicted from a previously coded and reconstructed block in the picture that best matches the block. In general, IntraBC is a block matching technique in which a block of samples, e.g., a coding unit (CU) or a prediction unit (PU), is predicted as a displacement from a reconstructed block of samples in a neighboring region in the same picture. Testing of some embodiments of IntraBC have shown it to be very effective for screen content video as it removes redundancy from repeating patterns which typically occur in text and graphics regions such as those illustrated in FIG. 1. More specifically, tests of embodiments of IntraBC have shown an average bit rate savings in the range of 2% to 44% for screen content video sequences.

A version of IntraBC based on a two dimensional (2D) search has currently been adopted in HEVC RExt. In this IntraBC, a 2D vector (Vx, Vy) is transmitted in the encoded bit stream for a coding unit (CU) to signal the displaced block which is similar to a current CU. Because a best IntraBC vector is searched over a 2D search space, the encoding complexity is high, and fast IntraBC cost estimation is needed to reduce encoding complexity.

Figure 2:
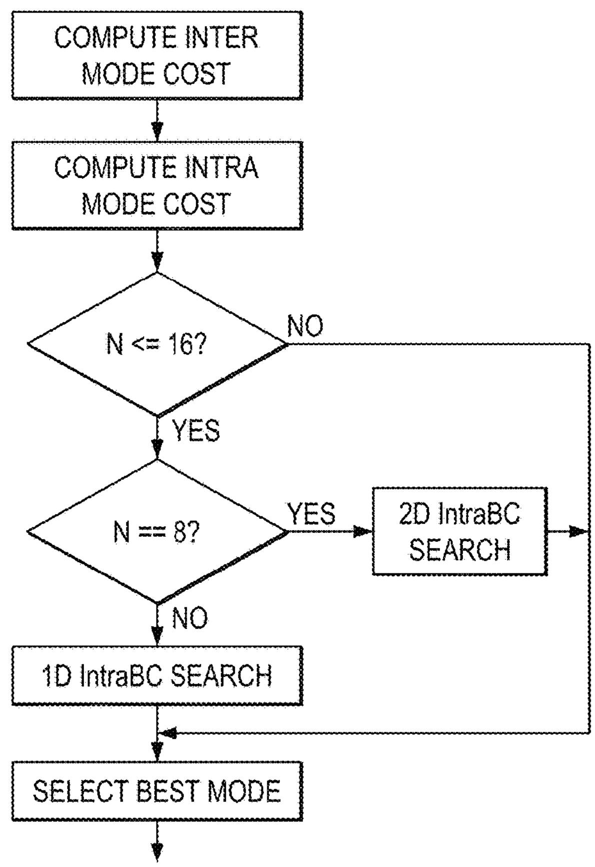
FIG. 2 is a flow diagram of a prior art method.

FIG. 2 is a flow diagram of a prior art method for IntraBC cost estimation. Because IntraBC mode is rarely selected as the best mode for 64×64 and 32×32 CUs, the prior art method bypasses IntraBC cost estimation for CUs of these sizes. In addition, the prior art method performs a one dimensional (1D) search (which includes cost estimation) for 16×16 CUs and only performs a 2D search (which includes cost estimation) for 8×8 CUs. However, the encoding complexity is still high due to the 2D search performed for 8×8 CUs. In general, 1D and 2D searches operate as follows. Assume that the horizontal and vertical search ranges are 0 to Sx−1 and 0 to Sy−1, respectively, where Sx and Sy are search ranges in the x and y directions. A 1D search finds a best displacement among Sx search points in the horizontal direction, i.e., (0, 0), (1, 0), (2, 0) (Sx−1, 0), and Sy search points in the vertical direction, i.e., (0, 1), (0, 2) . . . , (0, Sy−1), while a 2D search find a best displacement among Sx×Sy search points in a 2D space. The maximum values of Sx and Sx may be specified by the coding standard, e.g., HEVC, and may be further constrained by the encoder.

Embodiments of the invention provide for IntraBC cost estimation with reduced complexity, while allowing IntraBC cost estimation for CUs of all sizes provided certain conditions are met. In some embodiments, the decision as to whether or not to perform IntraBC cost estimation for a CU is based on the costs computed for inter-prediction (Inter Mode) and regular intra-prediction (Intra Mode) of the CU. In some embodiments, the decision as to whether or not to perform IntraBC cost estimation for a CU is based on whether or not IntraBC mode was selected for the parent CU and on the activity in the CU. In some embodiments, all three criteria are used to decide whether or not to perform IntraBC cost estimation for a particular CU.

Figure 3:
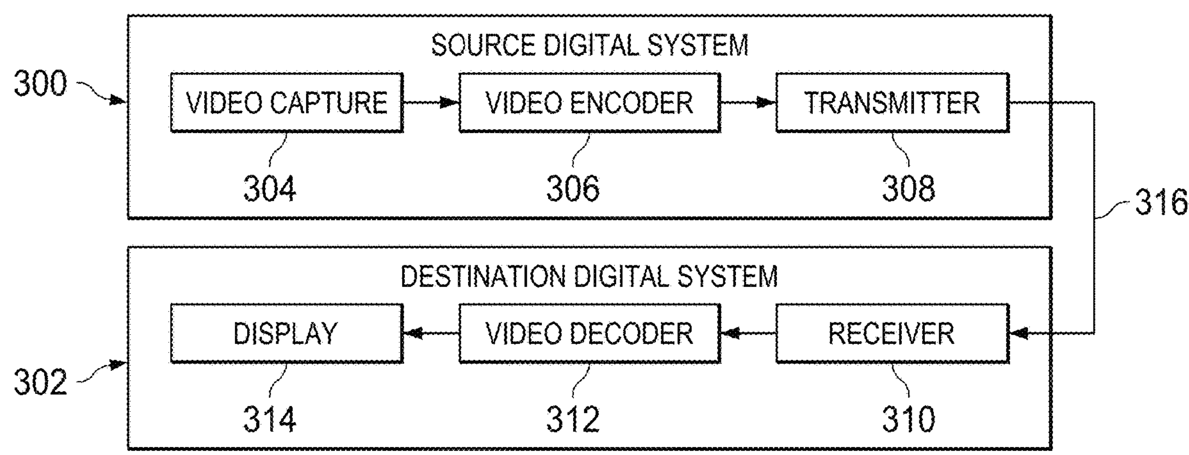
FIG. 3 is a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component

306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of pictures, divides the pictures into largest coding units (LCUs), and encodes the video data in the LCUs. The video encoder component 306 may be configured to perform IntraBC cost estimation during the encoding process as described herein. An embodiment of the video encoder component 306 is described in more detail herein in reference to FIG. 4.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video streaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4:
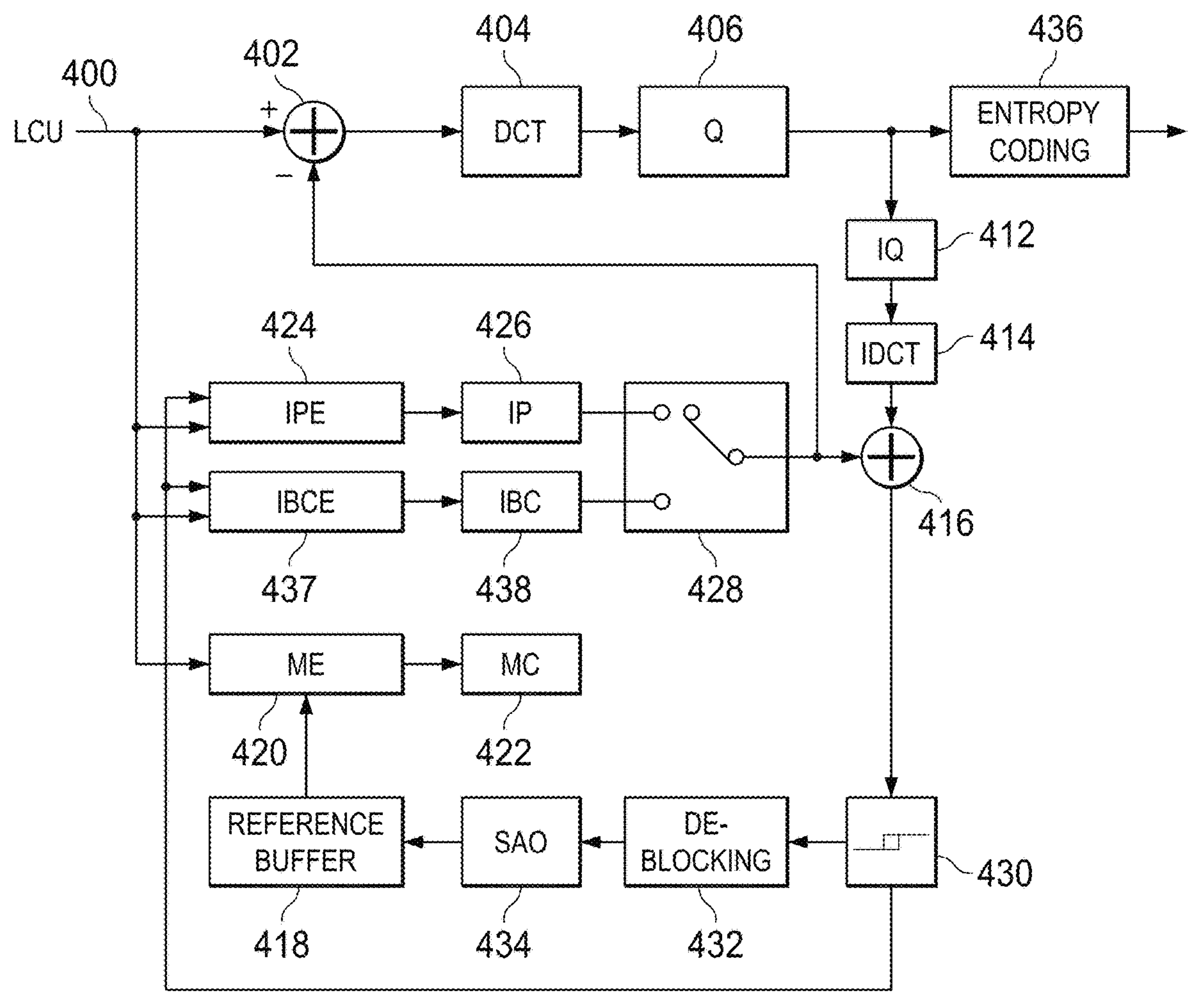
FIG. 4 is a block diagram of an example video encoder.

FIG. 4 is a block diagram of the LCU processing portion of an example video encoder providing IntraBC and configured to perform IntraBC cost estimation according to method embodiments described herein. The LCU processing receives LCUs 400 of an input video sequence from a coding control component (not shown) and encodes the LCUs 400 under the control of the coding control component to generate a compressed (encoded) video stream. The coding control component sequences the various operations of the video encoder, i.e., the coding control component runs the main control loop for video encoding. For example, the coding control component performs processing on the input video sequence that is to be done at the picture level, such as determining the coding type (I, P, or B) of a picture based on a high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCUs 400 from the coding control component are provided as one input of a motion estimation component (ME) 420, as one input of an intra-prediction estimation component (IPE) 424, as one input of an IntraBC estimation (IBCE) component 437, and to a positive input of a combiner 402 (e.g., adder or subtractor or the like). Further, although not specifically shown, the prediction mode of each picture as selected by the coding control component is provided to a mode decision component 428 and the entropy coding component 436.

The reference buffer 418 provides reference data to the motion estimation component 420 and to the motion compensation component 422. The reference data may include one or more previously reconstructed and filtered pictures, i.e., reference pictures. The reconstructed picture buffer 430 provides reconstructed picture data for the picture currently being encoded to the IPE component 424, the IBCE component 437, and the de-blocking filter component 432.

The motion estimation component 420 provides motion data information to the motion compensation component 422 and the entropy coding component 436. More specifically, the motion estimation component 420 performs tests on CUs in an LCU based on multiple inter-prediction modes (e.g., skip mode, merge mode, and normal or direct inter-prediction), PU sizes, and TU sizes using reference picture data from the reference buffer 418 to choose the best CU partitioning, PU/TU partitioning, inter-prediction modes, motion vectors, etc. based on coding cost, e.g., a rate distortion coding cost. To perform the tests, the motion estimation component 420 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 420 provides the motion vector (MV) or vectors and the prediction mode for each PU in the selected CU partitioning to the motion compensation component (MC) 422.

The motion compensation component 422 receives the selected inter-prediction mode and mode-related information from the motion estimation component 420 and generates the inter-predicted CUs. The inter-predicted CUs are provided to the mode decision component 428 along with the selected inter-prediction modes for the inter-predicted PUs and corresponding TU sizes for the selected CU/PU/TU partitioning. The coding costs of the inter-predicted CUs are also provided to the mode decision component 428.

The intra-prediction estimation component (IPE) 424 performs intra-prediction estimation in which tests on CUs in an LCU based on multiple intra-prediction modes, PU sizes, and TU sizes are performed using reconstructed data from previously encoded neighboring CUs stored in the reconstructed picture buffer 430 to choose the best CU partitioning, PU/TU partitioning, and intra-prediction modes based on coding cost, e.g., a rate distortion coding cost. To perform the tests, the intra-prediction estimation component 424 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 424 provides the selected intra-prediction modes for the PUs and the corresponding TU sizes for the selected CU partitioning to the intra-prediction component (IP) 426. The coding costs of the intra-predicted CUs are also provided to the intra-prediction component 426.

The intra-prediction component (IP) 426 receives intra-prediction information, e.g., the selected mode or modes for the PU(s), the PU size, etc., from the intra-prediction estimation component 424 and generates the intra-predicted CUs. The intra-predicted CUs are provided to the mode decision component 428 along with the selected intra-prediction modes for the intra-predicted PUs and corresponding TU sizes for the selected CU/PU/TU partitioning. The coding costs of the intra-predicted CUs are also provided to the mode decision component 428.

The IntraBC estimation component (IBCE) 437 provides block data information to the IntraBC component (IBC) 438. More specifically, when directed by the coding control component for a given CU, the IBCE 437 searches for a best matching block of the same size in a search area of reconstructed samples of the picture being encoded and estimates the coding cost for that best matching block. The coding control component may direct the IBCE 437 to estimate coding costs under certain conditions as are described in more detail in reference to method embodiments described herein. Further, in some embodiments, the coding control component may direct the IBCE 437 to perform a 1D search or a 2D search for the best matching block.

The IBCE component 437 further divides the CU into TUs according to the transform unit sizes, and calculates the coding costs for each CU size and transform unit size for each CU. The coding cost for a CU may be based on the best matching block found for the CU. The IntraBC estimation component (IBCE) 437 provides the block vectors for the CUs, and the corresponding TU sizes for the selected CU partitioning to the IntraBC component (IBC) 438. The coding costs of the IntraBC predicted CUs are also provided to the IBC component 438. A block vector is a two-dimensional vector that provides an offset from the coordinates of a CU to the coordinates of the best matching block in the search area.

The IntraBC component (IBC) 438 receives IntraBC information from the IBCE component 437 and generates the IntraBC predicted CUs. The IBC component 438 may generate an IntraBC predicted block using a block vector as follows. If (x0, y0) is the top-left corner of a block of samples with width w and height h, and (bx, by) is the block vector for the best matching block of reconstructed samples, the IBC component 438 may copy a block of reconstructed samples of size (w×h) from location (x0−bx, y0−by) in the search area. The IntraBC predicted CUs are provided to the mode decision component 428 along with the corresponding TU sizes for the selected CU/PU/TU partitioning. The coding costs of the IntraBC predicted CUs are also provided to the mode decision component 428.

The mode decision component 428 selects between intra-prediction of a CU, IntraBC prediction of a CU, and inter-prediction of a CU based on the intra-prediction coding cost of the CU from the intra-prediction component 426, the inter-prediction coding cost of the CU from the motion compensation component 422, the IntraBC prediction coding cost of the CU from the IntraBC compensation component 438, and the picture prediction mode provided by the coding control component. Based on the decision as to whether a CU is to be intra-coded, inter-coded, or IntraBC-coded, the intra-predicted PUs, inter-predicted PUs, or IntraBC-predicted PUs are selected. The selected CU/PU/TU partitioning with corresponding modes and other mode related prediction data (if any) such as block vector(s), motion vector(s) and reference picture index (indices) are provided to the entropy coding component 436.

The output of the mode decision component 428, i.e., the predicted PUs, is provided to a negative input of the combiner 402 and to the combiner 438. The associated transform unit size is also provided to the transform component 404. The combiner 402 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 404 performs block transforms on the residual CUs to convert the residual pixel values to transform coefficients and provides the transform coefficients to a quantize component 406. More specifically, the transform component 404 receives the transform unit sizes for the residual CU and applies transforms of the specified sizes to the CU to generate transform coefficients. Further, the quantize component 406 quantizes the transform coefficients based on quantization parameters (QPs) and quantization matrices provided by the coding control component and the transform sizes and provides the quantized transform coefficients to the entropy coding component 436 for coding in the bit stream.

The entropy coding component 436 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, slice headers, flags indicating the CU/PU/TU partitioning of an LCU, the prediction modes for the CUs, and the quantized transform coefficients for the CUs. The entropy coding component 436 also entropy encodes relevant data from the in-loop filters, such as the SAO parameters.

Further, for each CU, the entropy coding component 436 encodes a syntax element indicating whether or not the CU is coded in IntraBC mode. In some embodiments, for each CU encoded in IntraBC mode, the entropy coding component 436 encodes the block vector or vectors of the best matching block or blocks along with quantized transform coefficients of the CU. The block vector(s) may also be predicted and the difference between the block vector(s) and the predicted block vector(s) encoded.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 412, which outputs a reconstructed version of the transform result from the transform component 404. The dequantized transform coefficients are provided to the inverse transform component (IDCT) 414, which outputs estimated residual information representing a reconstructed version of a residual CU. The inverse transform component 414 receives the transform unit size used to generate the transform coefficients and applies inverse transform(s) of the specified size to the transform coefficients to reconstruct the residual values. The reconstructed residual CU is provided to the combiner 416.

The combiner 416 adds the original predicted CU to the residual CU to generate a reconstructed CU, which becomes part of reconstructed picture data. The reconstructed picture data is stored in the reconstructed picture buffer 430 for use by the IPE component 424, the IBCE component 437, and the de-blocking filter component 432.

Various in-loop filters may be applied to the reconstructed picture data to improve the quality of the reference picture data used for encoding/decoding of subsequent pictures. The in-loop filters may include a deblocking filter 432 and a sample adaptive offset filter (SAO) 434. The in-loop filters 432, 434 are applied to each reconstructed LCU in the picture and the final filtered reference picture data is stored in the reference buffer 418.

FIGS. 5-10 are flow charts of methods for IntraBC cost estimation of an N×N CU that may be performed in an encoder, e.g., the encoder of FIG. 4. The value of N may be, for example, 64, 32, 16, or 8. In each of these methods, IntraBC cost estimation is conditionally performed based on some criteria. In some methods, the criteria is based on the calculated cost for inter prediction of the CU and the calculated cost for intra prediction of the CU. More specifically, such methods exploit the fact that it is less probable that IntraBC mode will be selected for a CU if either the inter prediction cost or the intra prediction cost is very small. In some embodiments, the criteria are based on the activity in the CU and whether or not the parent CU was IntraBC encoded. More specifically, such methods are based on an observation that only approximately 10% to 15% of N×N CUs are coded in IntraBC mode when the parent 2N×2N CU is not coded in IntraBC mode. Further, N×N CUs in smooth areas, i.e., with low activity, are less likely to be coded in IntraBC mode.

The methods of FIGS. 5-10 all include steps for computing the inter prediction mode cost and the intra prediction mode cost of the N×N CU. Techniques for determining inter prediction and intra prediction modes for a CU and the respective encoding costs are well known and any suitable technique may be used. Further, in some embodiments, the intra prediction mode cost of these methods may be determined by the IPE component 424 of the encoder of FIG. 4, the inter prediction mode cost may be determined by the ME component 420, and the IntraBC mode cost may be determined by the IBCE component 437. The coding control component of the encoder may perform the computations to decide whether or not IntraBC cost estimation is to be performed and whether a 1D or 2D search is to be used for the cost estimation.

Figure 5:
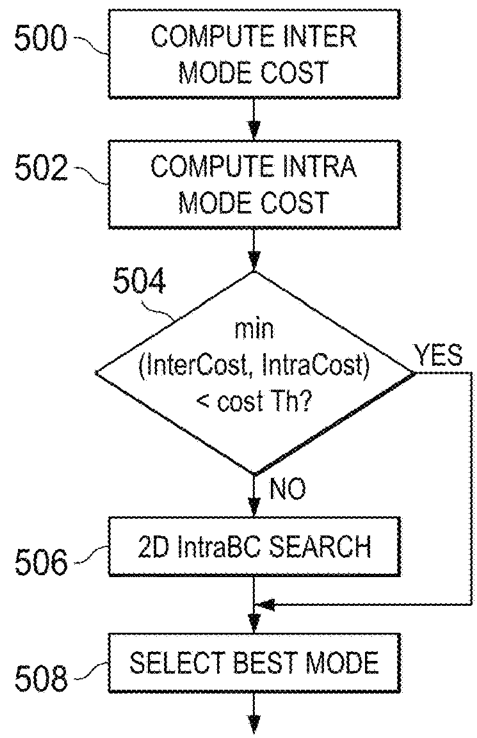
FIGS. 5-10 are flow diagrams of methods.

Referring first to the method of FIG. 5, the inter prediction mode cost (InterCost) for the N×N CU is computed 500 and the intra prediction mode cost (IntraCost) for the N×N CU is computed 502. If the minimum of these two costs is less than a cost threshold Th 504, then the IntraBC cost estimation is bypassed for the CU and the best mode for the CU is selected 508 from the inter prediction mode and the intra prediction mode. Otherwise, the IntraBC cost is estimated for the CU using a 2D search 506, and the best mode for the CU is selected 508 from the three modes. Any suitable value for the cost threshold Th may be used. In some embodiments, the value for the cost threshold Th may be empirically determined. In some embodiments, the cost threshold Th=min (48, 32×λ). The numeric values may be determined empirically. For example, when min (IntraCost, InterCost) is less than a cost threshold Th, a small percentage, i.e., n %, of such CUs will be IntraBC predicted. The value of n can be set to a very small value and the numeric values of the cost threshold Th computation determined empirically. The parameter λ is a Lagrange multiplier that is used in the mode decision and depends on the value of the quantization parameter.

Figure 6:
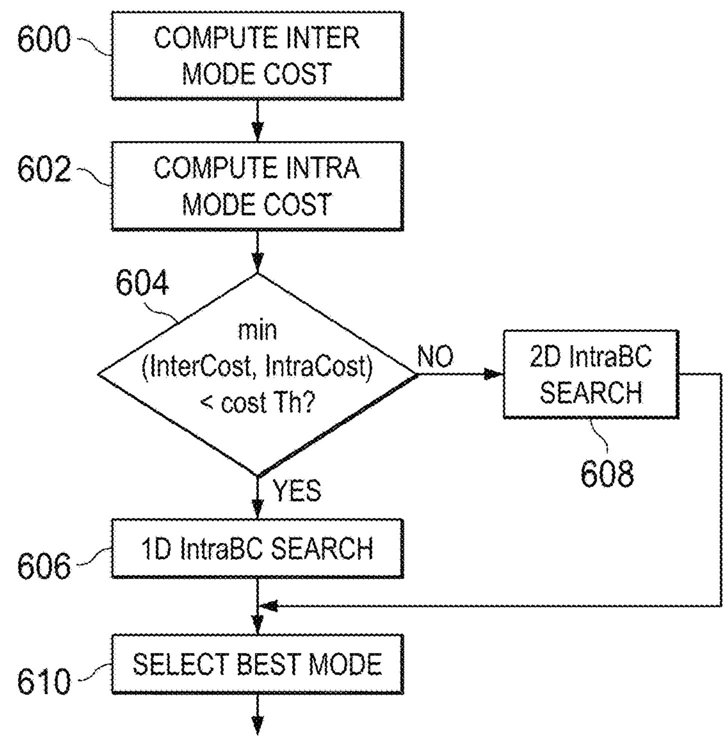

The method of FIG. 6 is a variation of the method of FIG. 5 in which, rather than bypassing IntraBC cost estimation when the minimum of the inter and intra prediction costs is less than the threshold, the IntraBC cost is estimated for the CU using a 1D search. As shown in FIG. 6, the inter prediction mode cost for the N×N CU is computed 600 and the intra prediction mode cost for the N×N CU is computed 602. If the minimum of these two costs is less than a cost threshold Th 604, then the IntraBC cost is estimated for the CU using a 1D search 506. Otherwise, the IntraBC cost is estimated for the CU using a 2D search 608. The best mode for the CU is then selected 610 from the three modes.

Figure 7:
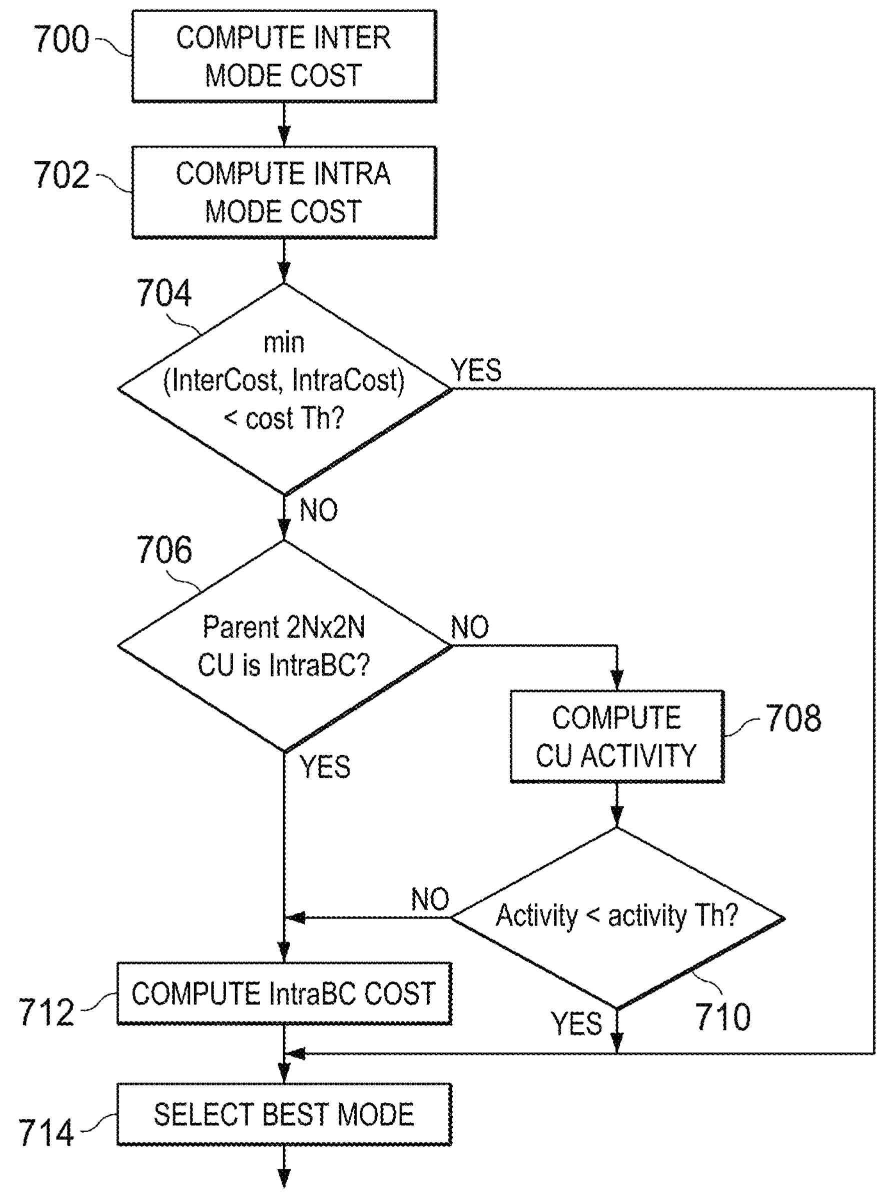

In the method of FIG. 7, the inter prediction mode cost for the N×N CU is computed 700 and the intra prediction mode cost for the N×N CU is computed 702. If the parent 2N×2N CU of the CU was encoded in IntraBC mode 704, then the IntraBC cost is estimated for the CU using a 2D search 712, and the best mode for the CU is then selected 714 from the three modes.

If the parent 2N×2N CU of the CU was not encoded in IntraBC mode 704, then the activity of the CU is computed 708. Any suitable technique for computing the activity may be used. In some embodiments, the activity is computed as $\min(Act_H, Act_V)$ where $$Act_H = \sum_{j=0}^{N-1} \sum_{i=1}^{N-1} |p(j, i) - p(j, i-1)|,$$

$$Act_V = \sum_{i=0}^{N-1} \sum_{j=1}^{N-1} |p(j, i) - p(j-1, i)|,$$

and p(j,i) is the original pixel at the j-th row and i-th column of a CU. If the computed activity is above an activity threshold TH 710, then the IntraBC cost is estimated for the CU using a 2D search 712, and the best mode for the CU is then selected 714 from the three modes. Otherwise, the IntraBC cost estimation is bypassed for the CU and the best mode for the CU is selected 714 from the inter prediction mode and the intra prediction mode.

Any suitable value for the activity threshold Th may be used. The value of the activity threshold may be empirically determined. In some embodiments, the activity threshold Th=168×(1<<(bitDepth−8)). For example, when the computed activity is less than the activity threshold Th, a small percentage, i.e., m %, of such CUs will be IntraBC predicted. The value of m can be set to a very small value and the numeric value of the activity threshold Th determined empirically. Note that in such embodiments, the threshold is dependent on input bit depth. For example, the activity threshold Th is based on the value 168 for 8-bit input, but this value will be 168×4 for 10-bit input.

Figure 8:
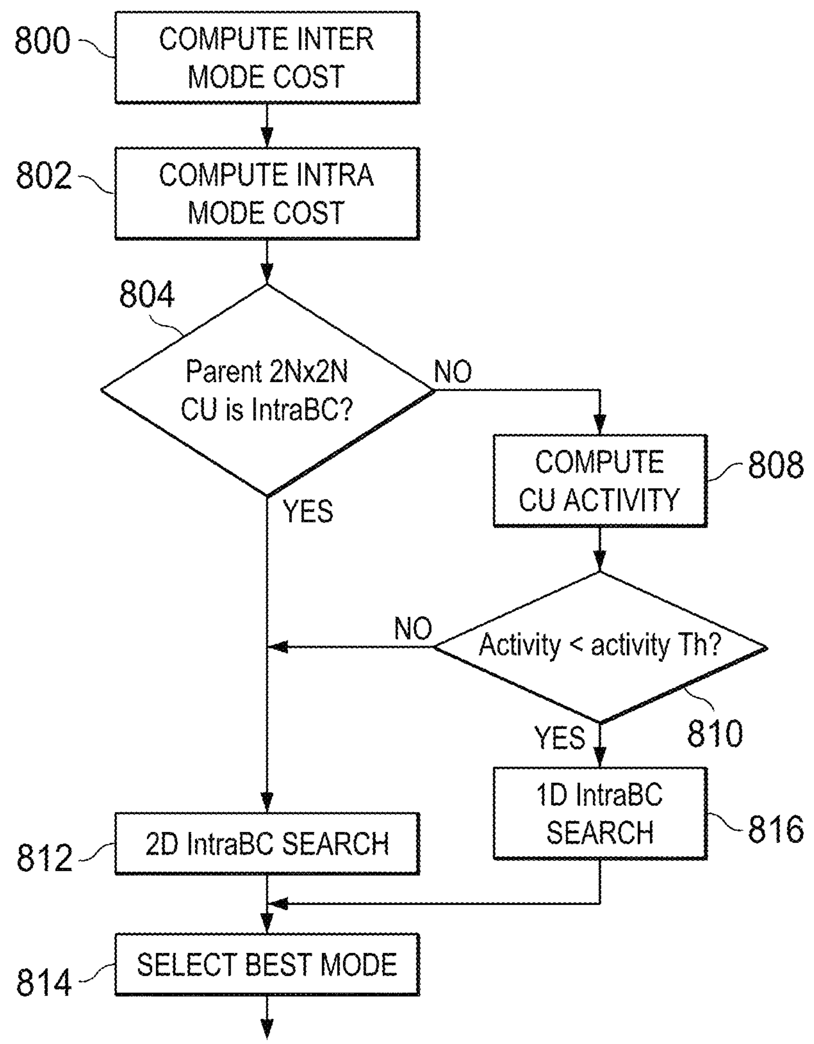

The method of FIG. 8 is a variation of the method of FIG. 7 in which, rather than bypassing IntraBC cost estimation when the computed activity is less than the activity threshold, the IntraBC cost is estimated for the CU using a 1D search. As shown in FIG. 8, the inter prediction mode cost for the N×N CU is computed 800 and the intra prediction mode cost for the N×N CU is computed 802. If the parent 2N×2N CU of the CU was encoded in IntraBC mode 804, then the IntraBC cost is estimated for the CU using a 2D search 812. If the parent 2N×2N CU of the CU was not encoded in IntraBC mode 804, then the activity of the CU is computed 808. If the computed activity is above an activity threshold Th 810, then the IntraBC cost is estimated for the CU using a 2D search 812. Otherwise, the IntraBC cost is estimated for the CU using a 1D search 816. The best mode for the CU is then selected 814 from the three modes.

Figure 9:
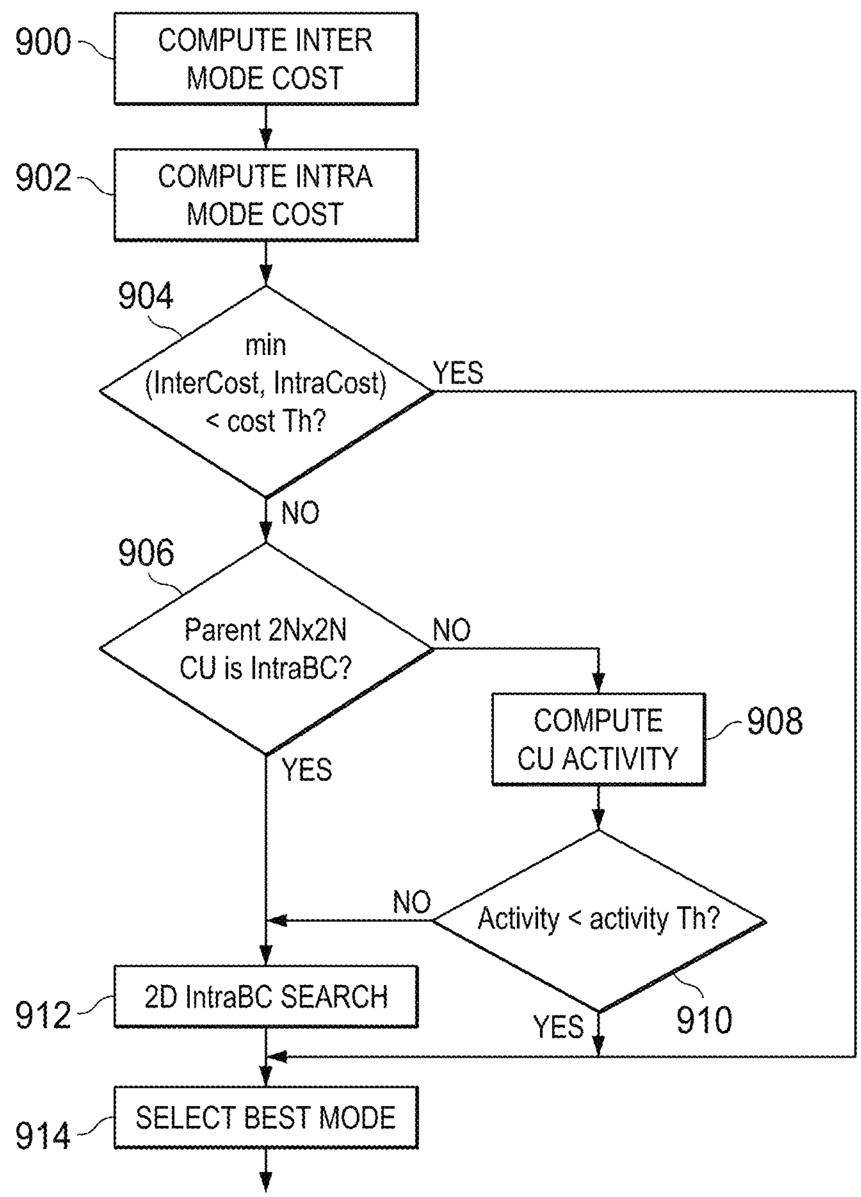

The method of FIG. 9 combines the methods of FIG. 5 and FIG. 7. As shown in FIG. 9, the inter prediction mode cost for the N×N CU is computed 900 and the intra prediction mode cost for the N×N CU is computed 902. If the minimum of these two costs is less than a cost threshold Th 904, then the IntraBC cost estimation is bypassed for the CU and the best mode for the CU is selected 914 from the inter prediction mode and the intra prediction mode. Otherwise, if the parent 2N×2N CU of the CU was encoded in IntraBC mode 906, then the IntraBC cost is estimated for the CU using a 2D search 912, and the best mode for the CU is then selected 914 from the three modes.

If the parent 2N×2N CU of the CU was not encoded in IntraBC mode 906, then the activity of the CU is computed 908. If the computed activity is above an activity threshold Th 910, then the IntraBC cost is estimated for the CU using a 2D search 912, and the best mode for the CU is then selected 914 from the three modes. Otherwise, the IntraBC cost estimation is bypassed for the CU and the best mode for the CU is selected 914 from the inter prediction mode and the intra prediction mode.

Figure 10:
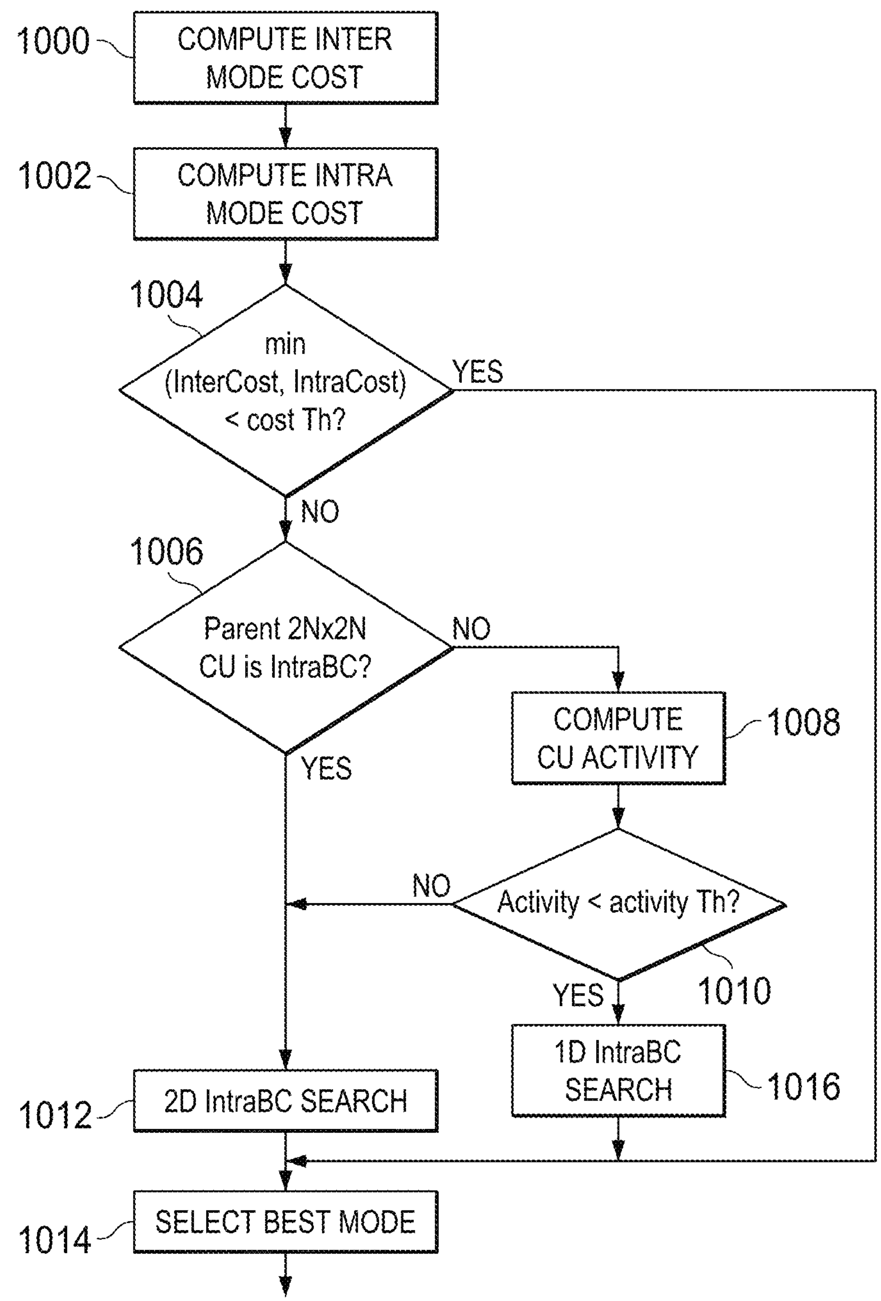

The method of FIG. 10 combines the methods of FIG. 5 and FIG. 8. As shown in FIG. 10, the inter prediction mode cost for the N×N CU is computed 1000 and the intra prediction mode cost for the N×N CU is computed 1002. If the minimum of these two costs is less than a cost threshold Th 1004, then the IntraBC cost estimation is bypassed for the CU and the best mode for the CU is selected 1014 from the inter prediction mode and the intra prediction mode. Otherwise, if the parent 2N×2N CU of the CU was encoded in IntraBC mode 1006, then the IntraBC cost is estimated for the CU using a 2D search 1012, and the best mode for the CU is then selected 1014 from the three modes. If the parent 2N×2N CU of the CU was not encoded in IntraBC mode 1006, then the activity of the CU is computed 1008. If the computed activity is above an activity threshold Th 1010, then the IntraBC cost is estimated for the CU using a 2D search 1012. Otherwise, the IntraBC cost is estimated for the CU using a 1D search 1016. The best mode for the CU is then selected 1014 from the three modes.

Figure 11:
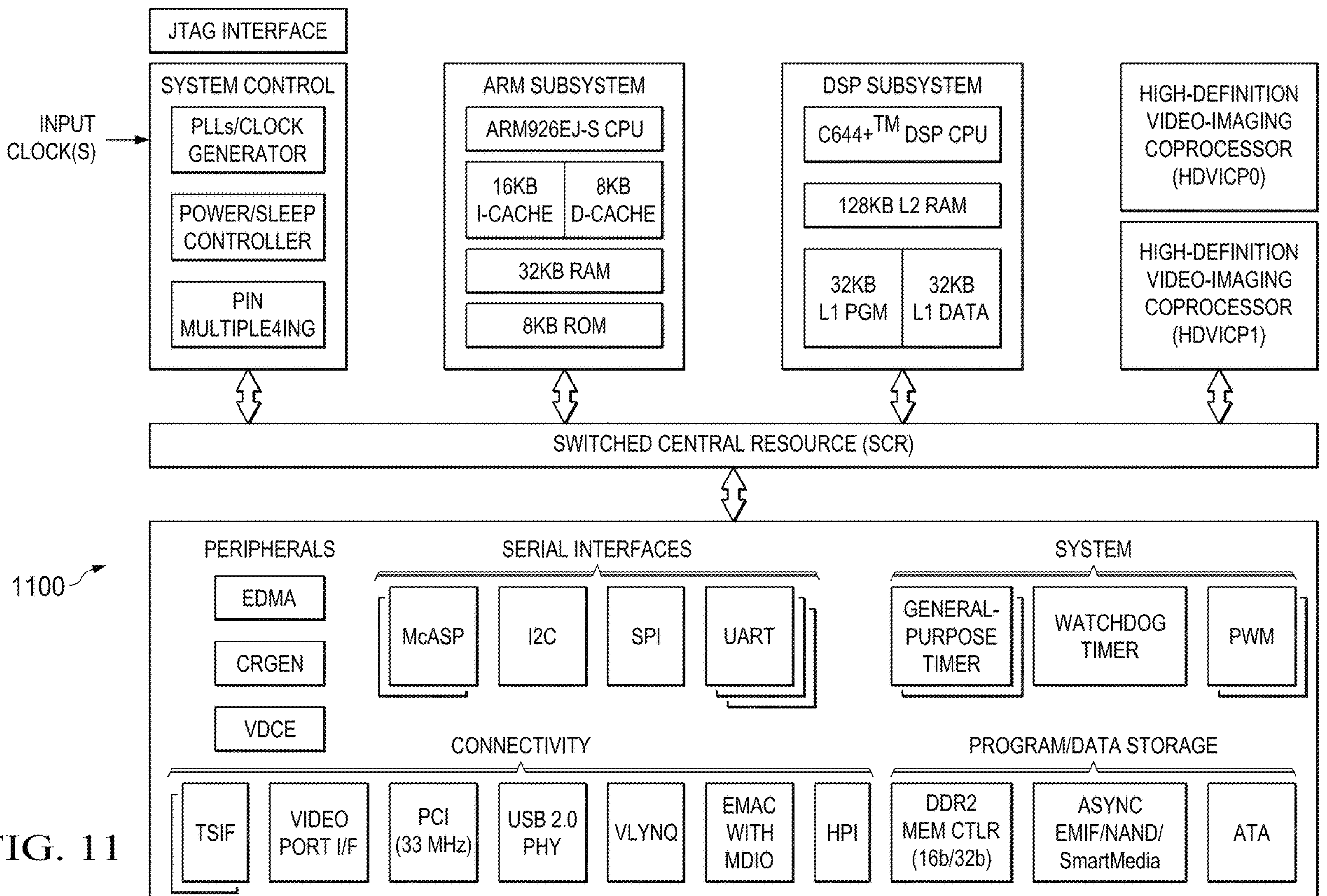
FIG. 11 is a block diagram of an illustrative digital system.

FIG. 11 is a block diagram of an example digital system suitable for use as an embedded system that may be configured to perform IntraBC cost estimation as described herein during encoding of a video stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1100 is a programmable platform designed to meet the processing needs of applications such as video encode/decode/transcode/transrate, video surveillance, video conferencing, set-top box, medical imaging, media server, gaming, digital signage, etc. The SoC 1100 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1100 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+™ core with a very-long-instruction-word (VLIW) architecture. In general, the ARM is responsible for configuration and control of the SoC 1100, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1100 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 11, the SoC 1100 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1100 may be configured to perform IntraBC cost estimation as described herein during encoding of a video stream. For example, the coding control of the video encoder of FIG. 4 may be executed on the DSP subsystem or the ARM subsystem and at least some of the computational operations of the LCU processing, including the intra-prediction, inter-prediction, and IntraBC prediction of mode selection, transformation, quantization, and entropy encoding may be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

Embodiments of the methods and encoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for encoding video data, the method comprising:

determining that a parent coding unit of a coding unit of the video data was not predicted in an intra-prediction block copy (IntraBC) mode; and in response to the determining that the parent coding unit was not predicted in IntraBC mode:

computing activity of the coding unit;

determining an IntraBC coding cost of the coding unit by:

computing the IntraBC coding cost of the coding unit using a two dimensional (2D) search when the activity of the coding unit is not less than an activity threshold;

computing the IntraBC coding cost of the coding unit using a one dimensional (1D) search when the activity of the coding unit is less than the activity threshold;

using the IntraBC coding cost to select an encoding mode from one of a plurality of encoding modes; and encoding the coding unit using the selected encoding mode.

2. The method of claim 1, wherein the plurality of encoding modes includes the IntraBC mode, an intra-prediction mode, and an inter-prediction mode.

3. The method of claim 2, comprising:

determining an inter-prediction coding cost of the coding unit; and determining an intra-prediction coding cost of the coding unit.

4. The method of claim 3, wherein selecting the encoding mode includes comparing the inter-prediction coding cost, the intra-prediction coding cost, and the IntraBC mode coding cost.

5. The method of claim 4, wherein the encoding mode is selected as the encoding mode having the lowest coding cost.

6. The method of claim 1, comprising, when it is determined that the parent coding unit was predicted in the IntraBC mode:

computing the IntraBC coding cost of the coding unit using a 2D search;

using the IntraBC coding cost to select an encoding mode from one of a plurality of encoding modes; and encoding the coding unit using the selected encoding mode.

7. The method of claim 6, wherein, when it is determined that the parent coding unit was predicted in the IntraBC mode, the plurality of encoding modes includes the IntraBC mode, an intra-prediction mode, and an inter-prediction mode, and the method further comprises:

determining an inter-prediction coding cost of the coding unit; and determining an intra-prediction coding cost of the coding unit.

8. The method of claim 7, wherein, when it is determined that the parent coding unit was predicted in the IntraBC mode, selecting the encoding mode includes comparing the inter-prediction coding cost, the intra-prediction coding cost, and the IntraBC coding cost, and selecting the encoding mode as the encoding mointra-predicde having the lowest coding cost.

9. The method of claim 1, comprising, prior to determining whether or not the parent coding unit of the coding unit was predicted in the IntraBC mode:

determining an inter-prediction coding cost of the coding unit; and determining an intra-prediction coding cost of the coding unit;

wherein determining whether or not the parent coding unit of the coding unit was predicted in the IntraBC mode is not performed when a minimum of the inter-prediction coding cost and the intra-prediction coding cost is less than a predetermined cost threshold.

10. The method of claim 9, comprising, when a minimum of the inter-prediction coding cost and the intra-prediction coding cost is less than a predetermined cost threshold, selecting an encoding mode as one of either an intra-prediction mode or an inter-prediction mode based which has a lower coding cost.

11. The method of claim 9, wherein the predetermined cost threshold is computed as a minimum of 48 and 32×λ, wherein λ is a Lagrange multiplier depending on a value of a quantization parameter.

12. The method of claim 1, wherein computing the activity of the coding unit includes computing min($Act_H$, $Act_V$), wherein:

$$Act_H = \sum_{j=0}^{N-1} \sum_{i=1}^{N-1} |p(j, i) - p(j, i-1)|;$$

$$Act_V = \sum_{i=0}^{N-1} \sum_{j=1}^{N-1} |p(j, i) - p(j-1, i)|;$$

p(j) is an original pixel at the j-th row and the i-th column of the coding unit.

13. The method of claim 1, wherein the activity threshold is computed as 168×(1<<(bitDepth−8)).

14. A method for encoding video data, the method comprising:

determining that a parent coding unit of a coding unit of the video data was not predicted in an intra-prediction block copy (IntraBC) mode; and in response to the determining that the parent coding unit was not predicted in IntraBC mode:

computing activity of the coding unit;

when the activity of the coding unit is not less than an activity threshold:

determining an IntraBC coding cost of the coding unit using a two dimensional (2D) search;

selecting an encoding mode as one of the IntraBC mode, an intra-prediction mode, and an inter-prediction mode based on a coding cost of each of these encoding modes; and encoding the coding unit using the selected encoding mode; and when the activity of the coding unit is less than the activity threshold:

selecting an encoding mode as one of the intra-prediction mode and the inter-prediction mode based on a coding cost of each of these encoding modes; and encoding the coding unit using the selected encoding mode.

15. A method for selecting a best mode for encoding a coding unit (CU) of video data in a video stream, the method comprising:

computing an inter-prediction coding cost for the CU;

computing an intra-prediction coding cost for the CU;

determining whether or not a minimum of the inter-prediction coding cost and the intra-prediction coding cost is less than a cost threshold;

when the minimum of the inter-prediction coding cost and the intra-prediction coding cost is less than a cost threshold:

computing an intra block copy (IntraBC) coding cost of the CU using a one dimensional (1D) search; and selecting a best mode for encoding the CU based the inter-prediction coding cost, the intra-prediction coding cost, and the IntraBC coding cost computed with the 1D search; and when the minimum of the inter-prediction coding cost and the intra-prediction coding cost is not less than a cost threshold:

determining whether or not a parent CU of the CU was predicted in IntraBC mode;

when the parent CU was predicted in IntraBC mode:

computing an IntraBC coding cost of the CU using a two dimensional (2D) search; and selecting the best mode for encoding the CU based the inter-prediction coding cost, the intra-prediction coding cost, and the IntraBC coding cost computed with the 2D search; and when the parent CU was not predicted in IntraBC mode:

computing activity of the CU;

determining whether the activity of the CU is less than an activity threshold;

when the activity is not less than the activity threshold:

computing an IntraBC coding cost of the CU using a 2D search; and selecting the best mode for encoding the CU based the inter-prediction coding cost, the intra-prediction coding cost, and the IntraBC coding cost computed with the 2D search; and when the activity is less than the activity threshold:

computing an IntraBC coding cost of the CU using a 1D search; and selecting the best mode for encoding the CU based the inter-prediction coding cost, the intra-prediction coding cost, and the IntraBC coding cost computed with the 1D search.

16. The method of claim 14 further comprising:

determining that a second parent coding unit of a second coding unit of the video data was predicted in an intra-prediction block copy (IntraBC) mode; and in response to the determining that the second parent coding unit was predicted in IntraBC mode:

determining a second IntraBC coding cost of the second coding unit using the two dimensional (2D) search;

selecting an encoding mode of the second coding unit as one of the IntraBC mode, the intra-prediction mode, and the inter-prediction mode based on a coding cost of each of these encoding modes; and encoding the second coding unit using the selected encoding mode for the second coding unit.

17. The method of claim 16, wherein the determining of the second IntraBC coding cost, the selecting of the encoding mode of the second coding unit, and the encoding of the second coding unit are performed without computing activity of the second coding unit.

* * * * *